United States Patent
Davis

(10) Patent No.: US 9,638,062 B2
(45) Date of Patent: May 2, 2017

(54) GEARED TURBOFAN ENGINE WITH INTEGRAL GEAR AND BEARING SUPPORTS

(71) Applicant: United Technologies Corporation, Hartford, CT (US)

(72) Inventor: Todd A. Davis, Tolland, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 133 days.

(21) Appl. No.: 14/460,479

(22) Filed: Aug. 15, 2014

(65) Prior Publication Data

US 2014/0356141 A1    Dec. 4, 2014

Related U.S. Application Data

(63) Continuation of application No. 12/785,537, filed on May 24, 2010, now Pat. No. 8,845,277.

(51) Int. Cl.
    *F01D 25/16* (2006.01)
    *F02K 3/06* (2006.01)
    *F02C 7/06* (2006.01)

(52) U.S. Cl.
    CPC ........... *F01D 25/162* (2013.01); *F01D 25/16* (2013.01); *F01D 25/164* (2013.01); *F02C 7/06* (2013.01); *F02K 3/06* (2013.01); *F05D 2230/60* (2013.01); *F05D 2240/50* (2013.01); *F05D 2260/4031* (2013.01); *Y10T 29/49229* (2015.01)

(58) Field of Classification Search
    CPC ...... F01D 25/162; F01D 25/164; F01D 25/16; F02C 7/06
    USPC ......... 415/142, 122.1, 124.1, 124.2; 416/160
    See application file for complete search history.

(56) References Cited

U.S. PATENT DOCUMENTS

| | | | |
|---|---|---|---|
| 2,862,356 A * | 12/1958 | Kent et al. | ........ 60/791 |
| 2,951,631 A | 9/1960 | Gregory | |
| 2,983,029 A | 5/1961 | Perin et al. | |
| 2,990,784 A | 7/1961 | Wahlmark | |
| 3,133,693 A | 5/1964 | Holl | |
| 3,163,353 A | 12/1964 | Petrie | |
| 3,269,118 A | 8/1966 | Benedict et al. | |
| 3,395,857 A | 8/1968 | Petrie et al. | |

(Continued)

FOREIGN PATENT DOCUMENTS

| | | | |
|---|---|---|---|
| DE | 1 051 287 | 2/1959 | |
| DE | 1051287 | * 2/1959 | ............ F01D 25/16 |

(Continued)

OTHER PUBLICATIONS

Extended European Search Report for Application No. 11167164.0 completed on Nov. 24, 2014.

*Primary Examiner* — Nathaniel Wiehe
*Assistant Examiner* — Jeffrey A Brownson
(74) *Attorney, Agent, or Firm* — Carlson, Gaskey & Olds, P.C.

(57) ABSTRACT

A gas turbine engine includes a bearing. A bearing support includes a first wall that extends between the first and second ends and is operatively supported by the bearing at a first end. An engine case is secured to the second end radially outward of the first end. A flexible support is provided by a second wall integral with and extending transversely from the first wall. The second wall has a first flange and a gear train component is secured to the first flange.

12 Claims, 3 Drawing Sheets

(56) References Cited

U.S. PATENT DOCUMENTS

| | | | |
|---|---|---|---|
| 3,491,536 A | 1/1970 | Hadaway | |
| 3,494,129 A | 2/1970 | Krebs et al. | |
| 3,505,813 A | 4/1970 | McCathy | |
| 3,534,557 A | 10/1970 | Petrie et al. | |
| 3,536,369 A | 10/1970 | Ainsworth et al. | |
| 3,546,880 A * | 12/1970 | Schwaar | 60/792 |
| 3,602,535 A | 8/1971 | Behning et al. | |
| 3,830,058 A | 8/1974 | Ainsworth | |
| 3,896,757 A | 7/1975 | Kucher | |
| 4,062,186 A | 12/1977 | Snow et al. | |
| 4,135,411 A | 1/1979 | Alessio | |
| 4,201,426 A | 5/1980 | Garten et al. | |
| 4,201,513 A | 5/1980 | Sales | |
| 4,264,272 A | 4/1981 | Weiler | |
| 4,289,360 A | 9/1981 | Zirin | |
| 4,306,755 A | 12/1981 | Roberts | |
| 4,313,712 A | 2/1982 | Briggs | |
| 4,457,667 A * | 7/1984 | Seibert et al. | 415/229 |
| 4,463,994 A | 8/1984 | Eliason et al. | |
| 4,523,864 A | 6/1985 | Walter et al. | |
| 4,573,809 A | 3/1986 | Jacob | |
| 4,578,942 A | 4/1986 | Weiler | |
| 4,598,600 A | 7/1986 | Knowles | |
| 4,683,714 A | 8/1987 | Thebert | |
| 4,744,214 A | 5/1988 | Monsarrat et al. | |
| 4,900,221 A | 2/1990 | Ciokajlo et al. | |
| 4,915,514 A | 4/1990 | Soderlund | |
| 4,916,894 A * | 4/1990 | Adamson et al. | 60/226.1 |
| 4,934,140 A | 6/1990 | Dennison et al. | |
| 5,029,439 A | 7/1991 | Berneuil et al. | |
| 5,154,580 A * | 10/1992 | Hora | 416/129 |
| 5,201,844 A | 4/1993 | Greenwood et al. | |
| 5,237,817 A | 8/1993 | Bornemisza et al. | |
| 5,249,934 A | 10/1993 | Merritt et al. | |
| 5,433,584 A | 7/1995 | Amin et al. | |
| 5,439,750 A * | 8/1995 | Ravenhall et al. | 428/614 |
| 5,791,789 A | 8/1998 | Van Duyn et al. | |
| 5,964,535 A * | 10/1999 | Feinstein et al. | 384/44 |
| 5,974,782 A | 11/1999 | Gerez | |
| 6,009,701 A | 1/2000 | Freeman et al. | |
| 6,109,022 A * | 8/2000 | Allen et al. | 60/223 |
| 6,135,712 A | 10/2000 | Chevrollier et al. | |
| 6,158,210 A | 12/2000 | Orlando | |
| 6,312,215 B1 | 11/2001 | Walker | |
| 6,428,269 B1 | 8/2002 | Boratgis et al. | |
| 6,431,756 B2 | 8/2002 | Maquire et al. | |
| 6,447,248 B1 | 9/2002 | Kastl et al. | |
| 6,619,030 B1 | 9/2003 | Seda et al. | |
| 6,622,473 B2 | 9/2003 | Becquerelle et al. | |
| 6,846,158 B2 | 1/2005 | Hull | |
| 6,877,950 B2 | 4/2005 | Liu | |
| 7,097,412 B2 | 8/2006 | DiTomasso | |
| 7,322,180 B2 | 1/2008 | Lapergue et al. | |
| 7,581,889 B2 | 9/2009 | Bruno et al. | |
| 8,038,386 B2 * | 10/2011 | Duchatelle et al. | 415/122.1 |
| 2002/0069637 A1 | 6/2002 | Becquerelle et al. | |
| 2004/0020186 A1 | 2/2004 | Orlando et al. | |
| 2004/0047731 A1 | 3/2004 | Hull | |
| 2005/0022501 A1 | 2/2005 | Eleftheriou et al. | |
| 2005/0172610 A1 | 8/2005 | Bart et al. | |
| 2005/0221946 A1 * | 10/2005 | Mitrovic | 475/331 |
| 2005/0241290 A1 | 11/2005 | Lapergue et al. | |
| 2005/0276683 A1 | 12/2005 | Lapergue et al. | |
| 2006/0153483 A1 | 7/2006 | Bridges et al. | |
| 2006/0260127 A1 * | 11/2006 | Gekht et al. | 29/889.21 |
| 2007/0006569 A1 | 1/2007 | Brault et al. | |
| 2007/0069596 A1 * | 3/2007 | Hemmi et al. | 310/90 |
| 2008/0173002 A1 * | 7/2008 | Gauthier et al. | 60/39.08 |
| 2010/0154384 A1 * | 6/2010 | Schilling | 60/268 |
| 2010/0218478 A1 * | 9/2010 | Merry et al. | 60/205 |

FOREIGN PATENT DOCUMENTS

| | | |
|---|---|---|
| EP | 0 814 236 | 12/1997 |
| EP | 1 013 896 | 6/2000 |
| EP | 1777404 | 4/2007 |
| FR | 2752024 | 2/1998 |
| GB | 1 556 266 | 11/1979 |

* cited by examiner

GEARED TURBOFAN ENGINE WITH INTEGRAL GEAR AND BEARING SUPPORTS

CROSS-REFERENCE TO RELATED APPLICATIONS

This disclosure is a continuation of U.S. patent application Ser. No. 12/785,537 filed May 24, 2010.

BACKGROUND

This disclosure relates to a gas turbine engine having a gear train used to drive a fan, and more particularly, the disclosure relates to structure used to support a portion of the gear train relative to a main bearing.

A main bearing is used to rotationally support a compressor rotor and input coupling. In a turbine engine having a gear train, which is used to drive a fan, the same main bearing may be used to rotationally support a gear train component. The gear train component is "soft mounted" to enable the gear train to deflect relative to the main bearing during engine operation. This deflection minimizes gear and bearing stresses by reducing the overall forces exerted within the fan drive system.

In one example arrangement, a main bearing support extends from the main bearing to the engine case. The "soft mount" is provided by a separate flexible structure that includes a steel outer disc that is bolted to the main support where it attaches to the engine case, providing a joint with three flanges. In one example, the main bearing support is constructed from titanium. The flexible support is provided by a stamped steel plate that is welded to a steel inner disc and the outer disc. A torque frame of the gear train is bolted to the inner disc plate.

SUMMARY

In one exemplary embodiment, a gas turbine engine includes a bearing. A bearing support includes a first wall that extends between first and second ends and is operatively supported by the bearing at a first end. An engine case is secured to the second end radially outward of the first end. A flexible support is provided by a second wall integral with and extending transversely from the first wall. The second wall has a first flange and a gear train component is secured to the first flange.

In a further embodiment of the above, the second wall intersects the first wall at a location spaced from the second end and the engine case. The gear train component is a torque frame.

In a further embodiment of any of the above, the first end provides a first support that has a surface with a first radius. A centering spring supports the bearing and is secured to the surface. The first flange has a second radius that is larger than the first radius to accommodate the centering spring during an assembly procedure.

In a further embodiment of any of the above, the first and second ends and the first flange each include multiple holes that are configured to receive centering spring fasteners secured respectively to the centering spring, the engine case and the torque frame.

In a further embodiment of any of the above, a centering spring supports the bearing. A main support is secured to the first end and the centering spring with fasteners.

In a further embodiment of any of the above, the first end includes a seal flange that extends in an axial direction and is radially outward of the main support. One of the main support and the seal flange includes a recess having a seal disposed therein and seals against the other of the main support and seal flange.

In a further embodiment of any of the above, the main support is constructed from a first material and the bearing and flexible supports are constructed from a second material.

In a further embodiment of any of the above, the first material is aluminum and the second material is titanium.

In another exemplary embodiment, a method of manufacturing a gas turbine engine includes providing bearing support that has a first wall that extends between first and second ends and a second wall integral with the first wall. The method also includes securing an engine case to the second end, securing a torque frame to a flange provided on the second wall, mounting a bearing to a centering spring, axially inserting the centering spring and bearing through the torque frame and securing the centering spring to the first end subsequent to securing a torque frame to a flange provided on the second wall.

In a further embodiment of the above, the method includes the steps of mounting an input coupling to the bearing, sliding the input coupling onto a hub and securing a nut to the hub to axially retain the input coupling on the hub.

In a further embodiment of any of the above, the method includes the steps of mounting an input gear on the input coupling and mounting a plate supporting intermediate gears onto the torque frame.

In a further embodiment of any of the above, the method includes providing a pocket between the first and second walls, and machining the pocket.

In a further embodiment of any of the above, the method includes providing first and second portions that respectively provide the second and first ends. The second portion includes the second wall and a portion of the first wall. The first and second portions are secured by a weld bead along the first wall.

In a further embodiment of any of the above, the method includes at least one of casting or forging the bearing support.

BRIEF DESCRIPTION OF THE DRAWINGS

The disclosure can be further understood by reference to the following detailed description when considered in connection with the accompanying drawings wherein.

DETAILED DESCRIPTION

Figure 1:
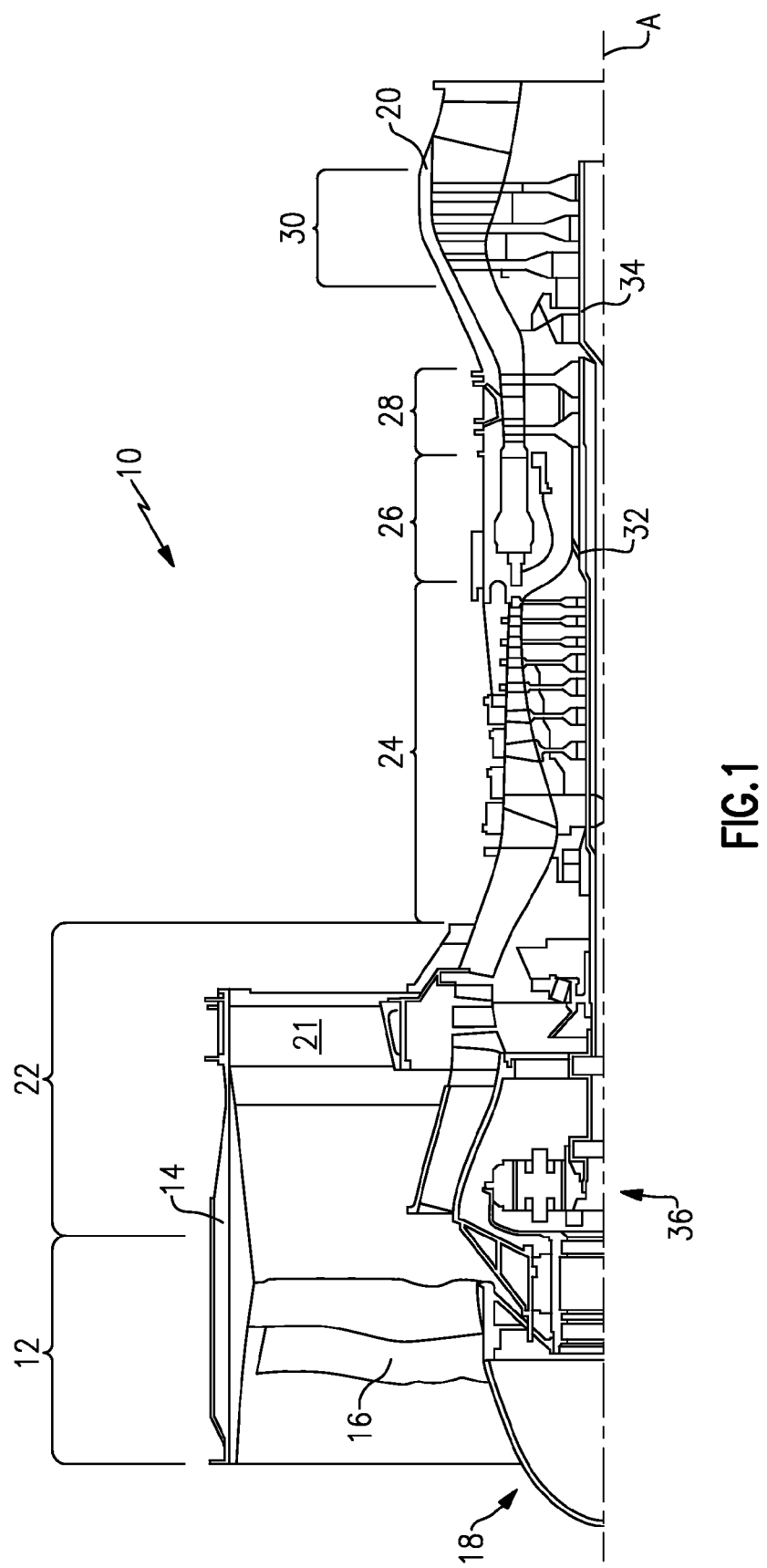
FIG. 1 is a schematic cross-sectional view of an example geared turbofan engine.

A geared turbofan engine 10 is illustrated in a highly schematic fashion in FIG. 1. Engine 10 includes a fan section 12 arranged within a fan case 14. The fan section 12 includes multiple blades arranged at an inlet 18 of the fan case 14. A core 20 is supported relative to the fan case 14 by flow exit guide vanes 21. The core 20 includes a low pressure compressor section 22, a high pressure compressor section 24, a combustor section 26, a high pressure turbine section 28 and a low pressure turbine section 30. In one example, the low pressure compressor section 22 and low pressure turbine section 30 are supported on a low spool 34 rotatable about an axis A. The high pressure compressor section 24 and high pressure turbine section 28 are supported on a high spool 32 rotatable about the axis A.

Figure 2:
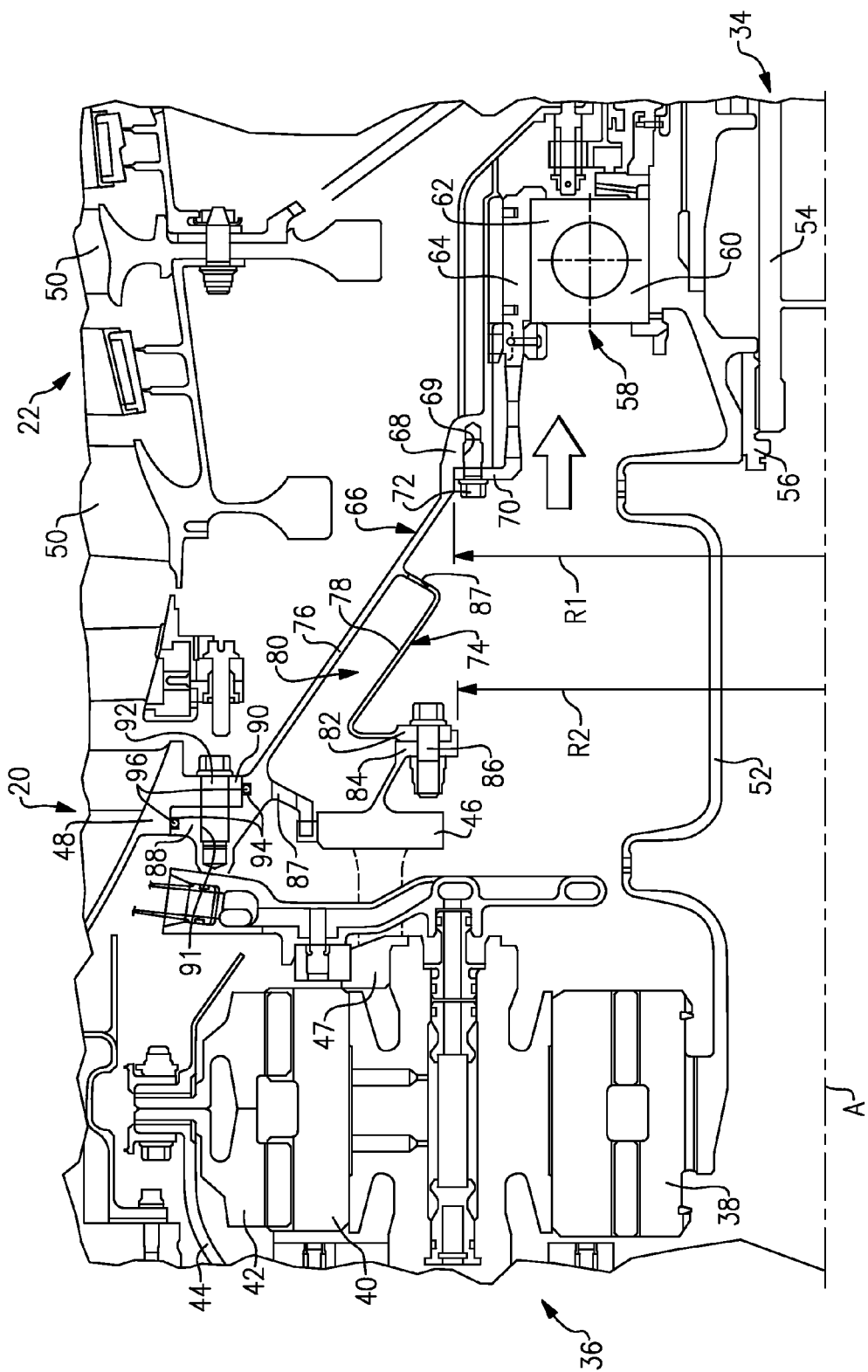
FIG. 2 is an enlarged cross-sectional view of the engine shown in FIG. 1 illustrating one example integrated gear and bearing support.

In the example engine 10, a gear train 36 is arranged between the low spool 34 and the fan section 12 to rotationally drive the fan blades 16 at a desired rotational speed that is lower than the low spool rotational speed. Referring to FIG. 2, the gear train 36 includes an input gear 38 that is operatively coupled to the fan section 12 (shown in FIG. 1). A ring gear 42 is coupled to a member 44, which rotationally drives the fan section 12 via multiple intermediate gears 40 arranged about the input gear 38 and intermeshed with the input gear 38 and the ring gear 42. Other epicyclic gear configurations may be used.

A torque frame 46 is operatively coupled to a case 48 of the core 20 for fixing the intermediate gears 40 against rotation. The torque frame 46 includes fingers that are illustrated by dashed lines in FIGS. 2 and 3. The fingers support a carrier 47 to which the intermediate gears 40 are mounted.

The low spool 34 rotationally drives compressor blades 50 in one or more stages of the low pressure compressor section 22. An input coupling 52 is rotationally supported relative to the low spool 34 by a main bearing 58, which is a ball bearing in one example. The input coupling 52 axially extends from the main bearing 58 to the input gear 38, which is splined to an end of the input coupling 52. The input coupling 52 is mounted to a hub 54, which is part of the low spool 34, and retained thereto by a nut 56.

An inner race 60 of the main bearing 58 is mounted to the input coupling 52, and an outer race 62 of the main bearing 58 is mounted to a centering spring 64. A main bearing support 66, which comprises a portion of the core support structure, is affixed to the centering spring 64. In the example illustrated, the frustoconical main bearing support 66 includes a first support 68 at a first end, and the centering spring 64 includes a centering spring flange 70 that engages the first support 68. In one example, the first support 68 includes a surface having a radius sized to accommodate the centering spring flange 70, which has a first radius R1. Multiple flange fasteners 72 are received in holes 69, secure the centering spring flange 70 to the first support 68.

A flexible support 74 is integral with the main bearing support 66, and are cast or forged from titanium, for example. By "integral" it is meant that the flexible support 74 and main bearing support 66 are permanently affixed to one another, rather than removably affixed such as by fasteners. By "permanently affixed" it is meant that destructive means such as cutting would be required to separate the flexible support 74 and main bearing support 66. The torque frame 46 includes a second flange 84 that is secured to a first flange 82 of the flexible support 74 by fasteners 86. The joint provided by the first and second flanges 82, 84 have a second radius R2 that is large enough to accommodate the centering spring flange 70 (and its first radius R1) during assembly.

The main bearing support 66 includes a first wall 76, and the flexible support 74 includes a second wall 78 that is spaced apart from the first wall 76 to provide a pocket 80. The first and second walls 76, 78 are integral with one another to provide the integrated flexible support 74 and main bearing support 66. Drain holes 87 are provided in at least one of the main bearing support 66 and the flexible support 74 and in communication with the pocket 80 to prevent oil from collecting within the pocket 80 during operation.

The first wall 76 of the main bearing support 66 extends from the first support 68 to a second support 88 at a second end of the main bearing support 66. The case 48 includes a case flange 90 that is secured to the second support 88 with second support fasteners 92 received by holes 91. A recess 94 is provided in one of the main bearing support 66 and the rotor 48. A seal 96 is disposed in the recess 94 to provide a seal between the rotor 48 and the main bearing support 66.

Figure 3:
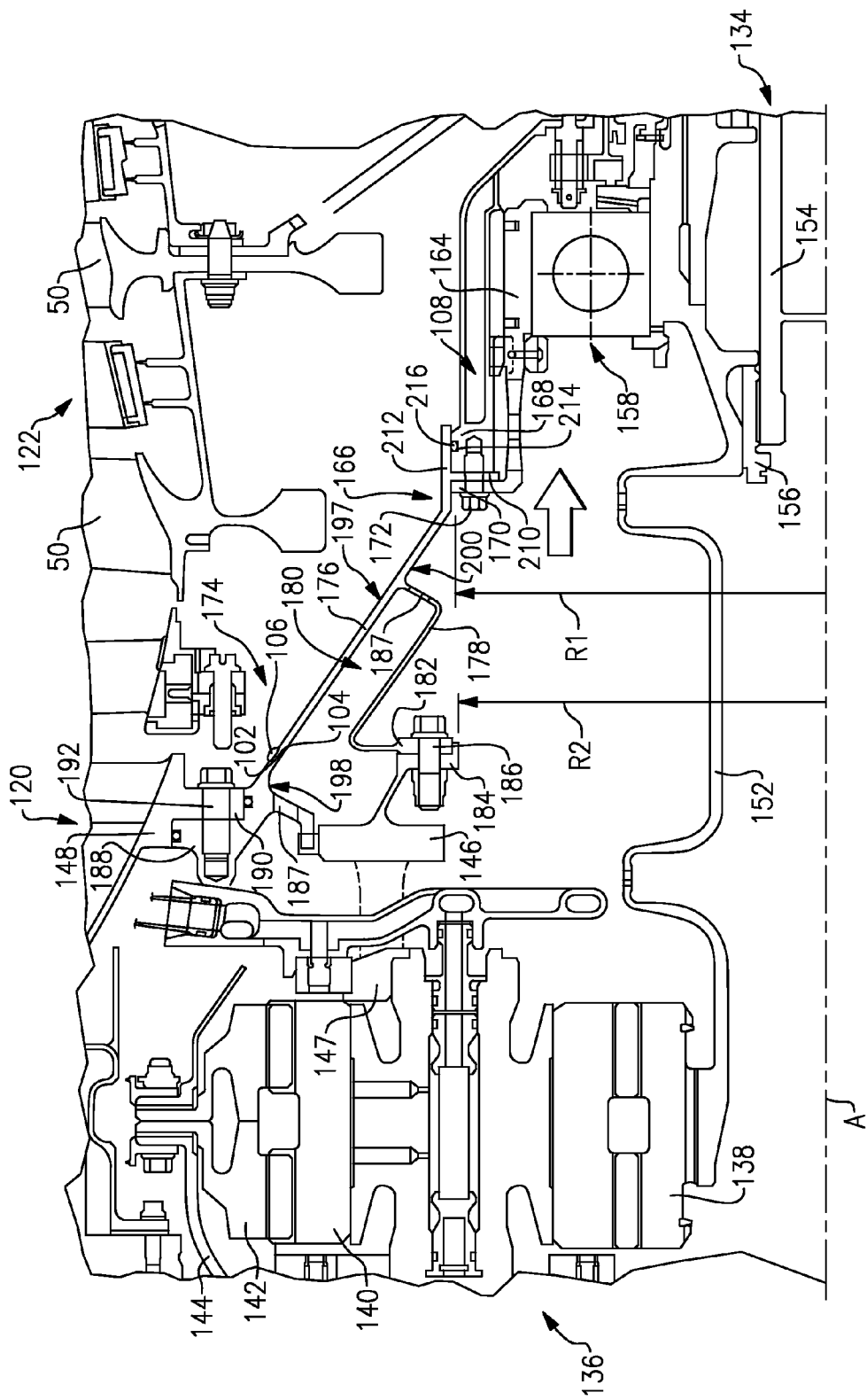
FIG. 3 is an enlarged cross-sectional view of the engine shown in FIG. 1 illustrating another example integrated gear and bearing support.

Another integrated main bearing support 166 and flexible support 174 is shown in FIG. 3. The low pressure compressor section 122 is rotationally driven with the low spool 134 within the core 120. The member 144, mounted to the ring gear 142, is rotationally driven by the input gear 138 via the intermediate gears 140. The intermediate gears 140 are retained in their circumferential position by the carrier 147 and torque frame 146.

The first wall 176 in the example is provided by first and second portions 198, 200. The first and second portions 198, 200, respectively include first and second edges 102, 104 that are secured to one another by a weld 106 or similar manufacturing/affixing method. Providing the first and second portions 198, 200 as two parts enables the pocket 180 to be machined more easily. Machining of the pocket 180 is desirable to obtain the desired wall thickness for the first and/or second walls 176, 178 for balance and strength of the structure in that area. First flange 182 of the second wall 178 is secure to the second flange 184 of the torque frame 146. Forming the first and second walls 176, 178 during a near-net forging operation may avoid the need to machine the pocket 180, for example. The drain holes 187 may be machined or cast, for example.

The main bearing support 166 is provided by an intermediate support 197 and a separate main support 108 that is supported by the main bearing 158 and secured to the centering spring 164. The intermediate support 197 includes an intermediate flange 210 that is mounted to and secured between the main support 108 and the centering spring 164 in the example shown. In one example, the main bearing support 166, flexible support 174 is constructed from titanium and the main support 108 is constructed from aluminum. A nickel alloy may also be used, for example. A seal flange 102 extends from the intermediate support 197. A recess 214 is provided in the main support 108 and receives a seal 216 that engages the seal flange 212.

During assembly, the case flange 190 of the case 148 is secured to the main bearing support 166 at the second support 188 by fasteners 192. The input coupling 152, main bearing 158 and centering spring 164 are assembled to one another. This assembly is installed onto the hub 154 with the main bearing support 166 in place to facilitate assembly, the centering spring 164 outer diameter R1 (and corresponding surface provided by the first support 168) is smaller than the joint inner diameter R2 of the torque frame/first flange joint. The centering spring 164 is secured to the main bearing support 166 with the flange fasteners 172 at the centering spring flange 170 and the input coupling 152 is secured to the hub 154 with the nut 156. The torque frame 146 is secured to the flexible support 174 with the fasteners 186. The gear train 136 is splined or affixed onto the input coupling 152. Assembly of the arrangement illustrated in FIG. 2 is similar to that described above in relation to the arrangement of FIG. 3.

Although an example embodiment has been disclosed, a worker of ordinary skill in this art would recognize that certain modifications would come within the scope of the claims. For that reason, the following claims should be studied to determine their true scope and content.

What is claimed is:

1. A gas turbine engine comprising:
a bearing;
a bearing support including a first wall extending between first and second ends and operatively supported by the bearing at a first end;
an engine case secured to the second end radially outward of the first end;
a flexible support provided by a second wall integral with and extending transversely from the first wall, the second wall having a first flange, wherein the second wall intersects the first wall at a location spaced from the second end and the engine case;
a torque frame secured to the first flange; and wherein the first end provides a first support having a surface with a first radius, and a centering spring supporting the bearing and secured to the surface, the first flange having a second radius larger than the first radius to accommodate the centering spring during an assembly procedure.

2. The gas turbine engine according to claim 1, wherein the first and second ends and the first flange each include multiple holes configured to receive centering spring fasteners secured respectively to the centering spring, the engine case and the torque frame.

3. The gas turbine engine according to claim 1, comprising a centering spring supporting the bearing, and a main support secured to the first end and the centering spring with fasteners.

4. The gas turbine engine according to claim 3, wherein the first end includes a seal flange extending in an axial direction and radially outward of the main support, one of the main support and the seal flange including a recess having a seal disposed therein and sealing against the other of the main support and seal flange.

5. The gas turbine engine according to claim 3, wherein the main support is constructed from a first material and the bearing and flexible supports are constructed from a second material.

6. The gas turbine engine according to claim 5, wherein the first material is aluminum and the second material is titanium.

7. A method of manufacturing a gas turbine engine comprising:
a) providing bearing support having a first wall extending between first and second ends, and a second wall integral with the first wall;
b) securing an engine case to the second end;
c) securing a torque frame to a flange provided on the second wall;
d) mounting a bearing to a centering spring;
e) axially inserting the centering spring and bearing through the torque frame; and
f) securing the centering spring to the first end subsequent to performing step c).

8. The method according to claim 7, comprising the steps of g) mounting an input coupling to the bearing, h) sliding the input coupling onto a hub, and i) securing a nut to the hub to axially retain the input coupling on the hub.

9. The method according to claim 8, comprising the steps of j) mounting an input gear on the input coupling, and k) mounting a plate supporting intermediate gears onto the torque frame.

10. The method according to claim 7, wherein step a) includes providing a pocket between the first and second walls, and machining the pocket.

11. The method according to claim 10, wherein step a) includes providing first and second portions that respectively provide the second and first ends, the second portion including the second wall and a portion of the first wall, the first and second portions secured by a weld bead along the first wall.

12. The method according to claim 10, wherein step a) includes at least one of casting or forging the bearing support.

\* \* \* \* \*